United States Patent
Lamba et al.

(10) Patent No.: US 8,516,474 B2
(45) Date of Patent: Aug. 20, 2013

(54) METHOD AND SYSTEM FOR DISTRIBUTING AN UPGRADE AMONG NODES IN A NETWORK

(75) Inventors: Jaideep S. Lamba, Plano, TX (US); Pravir A. Patel, McKinney, TX (US)

(73) Assignee: Alcatel Lucent, Paris (FR)

( * ) Notice: Subject to any disclaimer, the term of this patent is extended or adjusted under 35 U.S.C. 154(b) by 1049 days.

(21) Appl. No.: 12/462,267

(22) Filed: Jul. 31, 2009

(65) Prior Publication Data

US 2011/0029965 A1  Feb. 3, 2011

(51) Int. Cl.
*G06F 9/44* (2006.01)
(52) U.S. Cl.
USPC .......................................................... 717/172
(58) Field of Classification Search
USPC ................................ 717/168–173, 174–178
See application file for complete search history.

(56) References Cited

U.S. PATENT DOCUMENTS

| | | | |
|---|---|---|---|
| 6,966,058 B2* | 11/2005 | Earl et al. | 717/171 |
| 2006/0236318 A1* | 10/2006 | Moran et al. | 717/168 |
| 2008/0209414 A1* | 8/2008 | Stein | 717/173 |

\* cited by examiner

*Primary Examiner* — Anna Deng
(74) *Attorney, Agent, or Firm* — Carmen Patti Law Group, LLC

(57) ABSTRACT

A method for distributing an upgrade among a plurality of nodes communicatingly linked in a network includes: (a) introducing an upgrade element to a first node of the plurality of nodes; the upgrade element being appropriate for use by the first node for effecting the upgrade; (b) communicating the upgrade element from the first node to at least one other node of the plurality of nodes than the first node for use by the at least one other node for effecting the upgrade; (c) communicating the upgrade element from the at least one other node to at least one selected remaining node of the plurality of nodes not having received the upgrade element; and (d) repeating step (c) until the upgrade element is communicated to the plurality of nodes.

13 Claims, 2 Drawing Sheets

METHOD AND SYSTEM FOR DISTRIBUTING AN UPGRADE AMONG NODES IN A NETWORK

FIELD OF THE INVENTION

The present invention is directed to an ad hoc communication network or a traditional fixed network, and especially to effecting upgrades of nodes participating in such communication network using peer-to-peer distributed upgrade mechanism.

BACKGROUND OF THE INVENTION

Products comprising software and hardware may need to be upgraded from time to time with regards to, by way of example and not by way of limitation, new bug fixes and feature enhancements and additions. In some networks such as, by way of example and not by way of limitation, an ad-hoc network there is no known solution to upgrade products in a distributed fashion using controlled authenticated peer-to-peer mechanisms without going offline or connecting to the outside world (i.e., outside the ad hoc network) via the Internet or another network. The present invention applies to an ad hoc communication network or a traditional fixed network. Ad hoc networks will be addressed herein as exemplary networks for advantageously employing the method and system of the present invention.

Currently one can achieve upgrading nodes in an ad hoc network by either connecting to the remote products via Internet (or another network) and applying software upgrades or by bringing the products to a vendor location and performing an offline upgrade. Both such solutions may be costly and time consuming. Moreover, such solutions may not work well in an ad-hoc network where products may be purchased and deployed in a distributed fashion. This situation may be exacerbated by the possibility that there is no Internet connectivity to the product from a vendor location or the bandwidth available for such a remote connection for delivery is extremely expensive.

There is a need for a method and system for distributing an upgrade among nodes in an ad hoc network.

SUMMARY OF THE INVENTION

A method for distributing an upgrade among a plurality of nodes communicatingly linked in a network includes: (a) introducing an upgrade element to a first node of the plurality of nodes; the upgrade element being appropriate for use by the first node for effecting the upgrade; (b) communicating the upgrade element from the first node to at least one other node of the plurality of nodes than the first node for use by the at least one other node for effecting the upgrade; (c) communicating the upgrade element from the at least one other node to at least one selected remaining node of the plurality of nodes not having received the upgrade element; and (d) repeating step (c) until the upgrade element is communicated to the plurality of nodes. The plurality of nodes may include a plurality of mobile nodes.

A system for distributing an upgrade among a plurality of nodes communicatingly linked in a network includes: (a) an introducing unit coupled with a first node of the plurality of nodes; the introducing unit introducing an upgrade element to the first node; the upgrade element being appropriate for use in effecting the upgrade; (b) a first communicating unit coupled with the first mode and coupled with at least one other node of the plurality of nodes than the first node; the first communicating unit communicating the upgrade element from the first node to the at least one other node for use by the at least one other node in effecting the upgrade; and (c) at least one second communicating unit coupled with the at least one other node and coupled with at least one selected remaining node not having received the upgrade element; the at least one second communicating unit communicating the upgrade element from the at least one other node to the at least one selected remaining node not having received the upgrade element for use by the at least one selected remaining node not having received the upgrade element in effecting the upgrade. The plurality of nodes may include a plurality of mobile nodes.

It is, therefore a feature of the present invention to provide a method and system for distributing an upgrade among nodes in a network.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
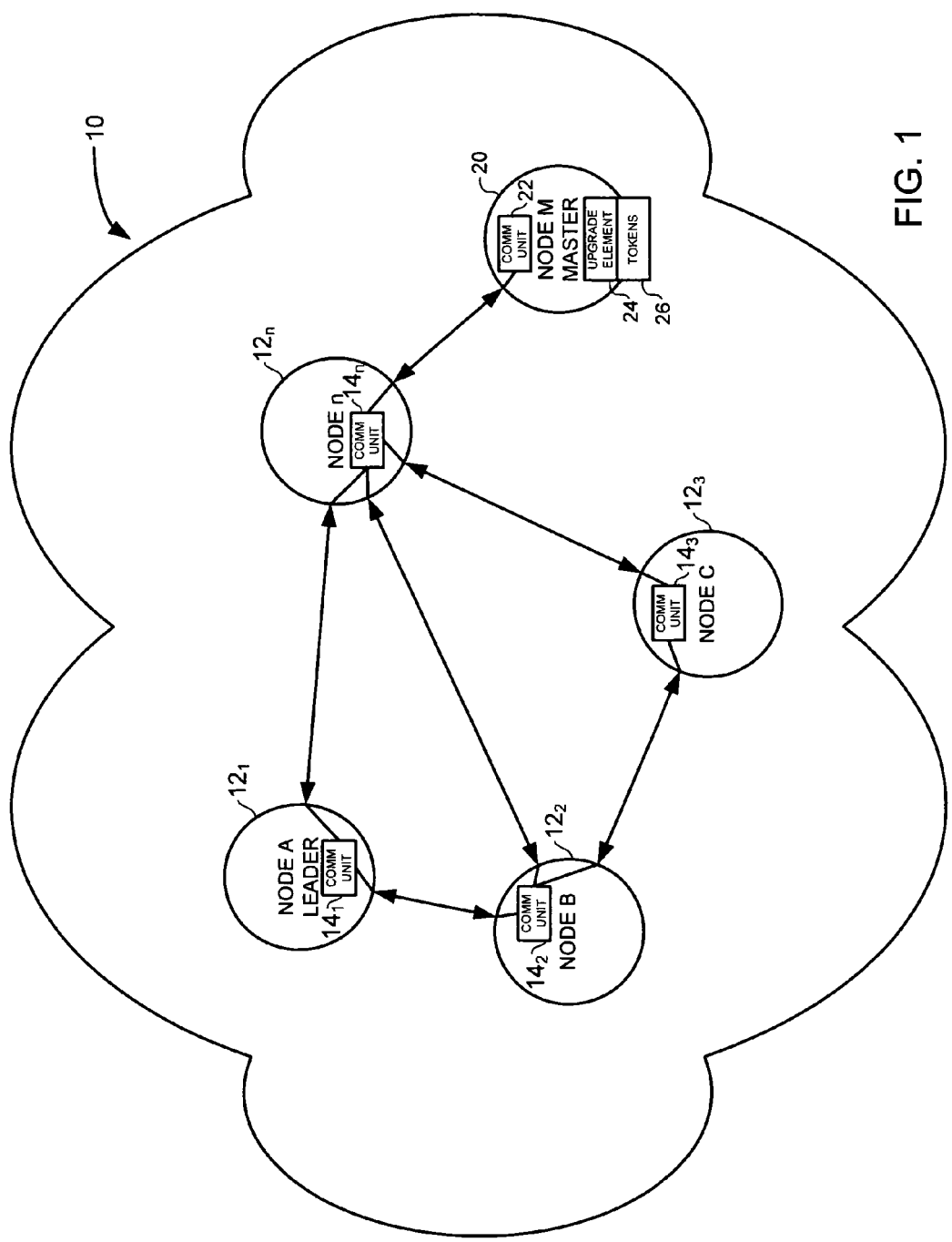
FIG. 1 is a schematic diagram illustrating an ad hoc network configured for employing the present invention.

FIG. 1 is a schematic diagram illustrating an ad hoc network configured for employing the present invention. In FIG. 1, an ad hoc network 10 includes a plurality of nodes $12_1$, $12_2$, $12_3$, $12_n$. The indicator "n" is employed to signify that there can be any number of nodes in network 10. The inclusion of four nodes $12_1$, $12_2$, $12_3$, $12_n$ in FIG. 1 is illustrative only and does not constitute any limitation regarding the number of nodes that may be included in a network employing the present invention. Throughout this description, use of a reference numeral using a generic subscript herein may be taken to mean that any respective member of the plurality of elements having the same reference numeral may be regarded as included in the description. Thus, by way of example and not by way of limitation, referring to node $12_n$ in describing FIG. 1 may be taken to mean that any node—$12_1$, $12_2$, $12_3$, or $12_n$ (FIG. 1)—may be regarded as capable of employment as described.

Node $12_1$ is configured with a communication unit $14_1$ to facilitate communications between node $12_1$ and elements outside node $12_1$, such as other nodes $12_n$. Node $12_2$ is configured with a communication unit $14_2$ to facilitate communications between node $12_2$ and elements outside node $12_2$, such as other nodes $12_n$. Node $12_3$ is configured with a communication unit $14_3$ to facilitate communications between node $12_3$ and elements outside node $12_3$, such as other nodes $12_n$. Node $12_n$ is configured with a communication unit $14_n$ to facilitate communications between node $12_n$ and elements outside node $12_n$, such as other nodes $12_n$.

Consider ad-hoc network 10 with nodes $12_n$ having different software versions. Nodes $12_n$ can communicate with each other using inter-node communication (by way of example and not by way of limitation, an ad hoc WiFi mesh network). If one wishes to upgrade ad hoc network 10 with a uniform software version, one may introduce an upgrade element 24 to ad hoc network 10. Upgrade element 24 would be appropriate for use by nodes $12_n$ for effecting the desired upgrade by each respective node $12_n$. One may conceivably introduce an upgrade element 24 to network 10 using a communication link with one of nodes $12_n$, such as via the Internet or another network. However, in an ad hoc network there may be no effective Internet or other communication link from without network 10. By way of example and not by way of limitation, such an ad hoc network may be embodied in a deployed group of mobile units operating independently of a base and beyond communication range from the base, directly or indirectly. In the case of such a deployed mobile ad hoc network, for example, it may not be practically feasible to deliver a CD-ROM or other data media to a node $12_n$ for installation or to otherwise deliver a data media to network 10.

One solution to introducing an upgrade element may be to deploy a master node 20 to within communication range of one node $12_n$ to establish communication with the in-range node $12_n$ for purposes of introducing an upgrade element to in-range node $12_n$.

Master mode 20 may be configured with a communication unit 22 and may carry an upgrade element 24 for delivery to nodes $12_n$ in network 10. When master node 20 approaches within communication range of node $12_n$, master node 20 and node $12_n$ may effect an authentication procedure to assure both node $12_n$ and master node 20 that they are authorized to communicate with each other. When more than one organization or corporate entity is operating in network 10, authentication may also operate to assure nodes $12_n$ and master node 20 that they are both affiliated with organizations that are authorized to communicate with each other within network 10. After master node 20 conveys upgrade element 24 to in-range node $12_n$, in-range node $12_n$ may in turn further distribute upgrade element 24 to other nodes $12_n$ in network 10. Any node $12_n$ within communication range of master node 20 may operate as an in-range node $12_n$ to receive upgrade element 24. More than one node $12_n$ within communication range of master node 20 may operate as an in-range node $12_n$ to receive upgrade element 24. Master node 20 may convey upgrade element 24 to other nodes $12_n$ in network 10. Nodes $12_n$ receiving upgrade element 24 from in-range node $12_n$ may also participate in further distributing upgrade element 24 within network 10. Numerous nodes $12_n$ may thereby be quickly involved in distributing upgrade element 24 within network 10 in a branching type of pattern to speed distribution of upgrade element 24 throughout network 10.

One node $12_1$ may be configured as a leader node. Leader node $12_1$ may become aware of availability of update element 24 in network 10 via direct communication with master node 20 or via communication with another node $12_n$ that is in communication with master node 20. Leader node $12_1$ may communicate to all nodes $12_n$ in network 10 to advise all nodes $12_n$ that update element 24 is available. Leader node $12_1$ may oversee updating of nodes $12_n$ within network 10 to ensure that all nodes $12_n$ receive update element 24.

Upgrade element 24 may include or be accompanied by a predetermined number of tokens 26. Tokens 26 may be employed to represent a predetermined number of allowed upgrades such as, by way of example and not by way of limitation, a number determined by licensing limitations pertaining to the software being upgraded. Master node 20 may pass a predetermined number of tokens 26 to in-range node $12_n$ along with upgrade element 24. In-range node $12_n$ may pass tokens to subsequent receiving nodes $12_n$ and tokens may accompany upgrade element 24 throughout distribution within network 10 to assure that no more than a predetermined number of upgrade elements 24 may be distributed in network 10.

Figure 2:
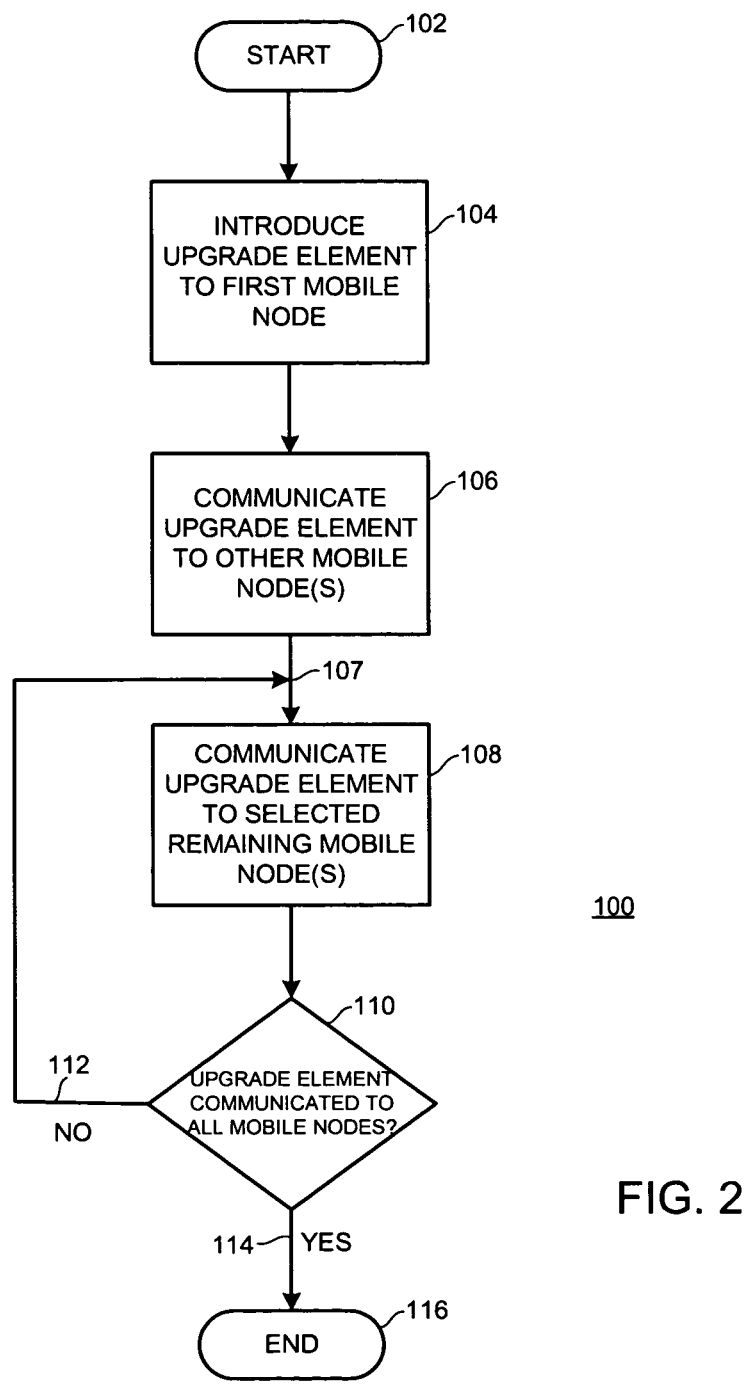
FIG. 2 is a flow diagram illustrating the method of the present invention.

FIG. 2 is a flow diagram illustrating the method of the present invention. In FIG. 2, a method 100 for distributing an upgrade among a plurality of mobile nodes communicatingly linked in an ad hoc network begins at a START locus 102.

Method 100 continues with introducing an upgrade element to a first mobile node of the plurality of mobile nodes, as indicated by a block 104. The upgrade element is appropriate for use by the first mobile node for effecting the upgrade.

Method 100 continues with communicating the upgrade element from the first mobile node to at least one other mobile node of the plurality of mobile nodes than the first mobile node for use by the at least one other mobile node for effecting the upgrade, as indicated by a block 106.

Method 100 continues with communicating the upgrade element from the at least one other mobile node to at least one selected remaining mobile node of the plurality of mobile nodes not having received the upgrade element, as indicated by a block 108.

Method 100 continues with posing a query whether the upgrade element has been communicated to all mobile nodes of the plurality of mobile nodes, as indicated by a query block 110.

If the upgrade element has not been communicated to all mobile nodes of the plurality of mobile nodes, method 100 proceeds from query block 110 via a NO response line 112 to a node 107 and steps represented by blocks 108, 110 are repeated.

If the upgrade element has been communicated to all mobile nodes of the plurality of mobile nodes, method 100 proceeds from query block 110 via a YES response line 114 and method 100 terminates at an END locus 116.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A method for distributing an upgrade among a plurality of nodes communicatingly linked to each other to form an ad-hoc network, said network operating independently of a base node and beyond communication range of the base node; the method comprising:

(a) temporarily locating a master node carrying an upgrade element and one or more tokens within communication range of one or more first nodes of said plurality of nodes; said upgrade element being appropriate for use by said one or more first nodes for effecting said upgrade, and said one or more tokens corresponding to the number of nodes of said ad-hoc network that are allowed to receive the upgrade;

(b) performing an authentication process between the master node and the one or more first nodes;

(c) transferring the upgrade element and at least one token of the one or more tokens from the master node to each of the one or more first nodes;

(d) communicating said upgrade element and at least one or more remaining tokens from said one or more first nodes that received a plurality of tokens to at least one other node of said plurality of nodes using said ad-hoc network; and (e) repeating step (d) by said one or more first nodes and said at least one other node until said upgrade element is communicated to said plurality of nodes or until a number of nodes in the ad hoc network corresponding to the number of tokens transferred from the master node have received the upgrade.

2. The method for distributing an upgrade among a plurality of nodes communicatingly linked to each other to form an ad-hoc network as recited in claim 1 wherein said master node is an additional node which is not part of the ad-hoc network of said first node.

3. The method for distributing an upgrade among a plurality of nodes communicatingly linked to each other to form an ad-hoc network as recited in claim 1 wherein one node of said plurality of nodes is a leader node; said leader node accounting for an extant said plurality of nodes populating said network and accounting for an upgrade-level of each respective node of said extant plurality of nodes populating said network; said leader node notifying other nodes of said plurality of nodes than said leader node of availability of said upgrade element.

4. The method for distributing an upgrade among a plurality of nodes communicatingly linked to each other to form an ad-hoc network as recited in claim 2 wherein one node of said plurality of nodes is a leader node; said leader node accounting for an extant said plurality of nodes populating said network and accounting for an upgrade-level of each respective node of said extant plurality of nodes populating said network; said leader node notifying other nodes of said plurality of nodes than said leader node of availability of said upgrade element.

5. A method for distributing an upgrade among a plurality of nodes communicatingly linked to each other to form an ad-hoc network as recited in claim 1 wherein said master node can transfer the upgrade element and one or more tokens to a plurality of first nodes in said ad-hoc network at the same time.

6. A system for distributing an upgrade among a plurality of nodes comprising both hardware and software elements, said nodes communicatingly linked to each other to form an ad-hoc network, said network operating independently of a base node and beyond communication range of the base node; the system comprising:

(a) a master node further comprising hardware elements, software elements and a communication unit for introducing an upgrade element and one or more tokens to nodes in said ad-hoc network; said upgrade element being appropriate for use in effecting said upgrade, and said one or more tokens corresponding to the number of nodes of said ad-hoc network that are allowed to receive the upgrade;

(b) one or more first nodes in said ad-hoc network, each said first nodes having hardware elements, software elements and a first communicating unit coupled with at least one other node of said plurality of nodes in said ad-hoc network; said first communicating unit receiving said upgrade element and at least one or more tokens from said master node and communicating them to said at least one other node for use by said at least one other node in effecting said upgrade; and (c) one or more additional nodes in said ad-hoc network, each said additional node having hardware elements, software elements and at least one communicating unit coupled with said at least one first node and coupled with at least one selected remaining node not having received said upgrade element; each said additional node receiving said upgrade element and one or more tokens from one of said first nodes and communicating said upgrade and one or more tokens to at least one selected remaining node not having received said upgrade element.

7. The system for distributing an upgrade among a plurality of nodes as recited in claim 6 wherein said said master node is an additional node which is not part of the ad-hoc network of said first node.

8. The system for distributing an upgrade among a plurality of nodes as recited in claim 6 wherein one node of said plurality of nodes is a leader node; said leader node accounting for an extant said plurality of nodes populating said network and accounting for an upgrade-level of each respective node of said extant plurality of nodes populating said network; said leader node notifying other nodes of said plurality of nodes than said leader node of availability of said upgrade element.

9. The system for distributing an upgrade among a plurality of nodes as recited in claim 7 wherein one node of said plurality of nodes is a leader node; said leader node accounting for an extant said plurality of nodes populating said network and accounting for an upgrade-level of each respective node of said extant plurality of nodes populating said network; said leader node notifying other nodes of said plurality of nodes than said leader node of availability of said upgrade element.

10. A system for distributing an upgrade among a plurality of nodes as recited in claim 6 wherein said master node can introduce the upgrade element and one or more tokens to a plurality of first nodes in said ad-hoc network at the same time.

11. A method for delivering an upgrade to a plurality of nodes operating in an ad-hoc network, said network operating independently of a base node and beyond communication range of the base node, the method comprising:

(a) introducing said upgrade to said ad-hoc network by temporarily locating a master node carrying the upgrade and one or more tokens within communication range of one or more first nodes of said ad-hoc network, wherein said master node which is not part of the one or more first nodes of said ad-hoc network;

(b) receiving said upgrade and at least one token of the one or more tokens by the one or more first nodes of said ad-hoc network from the master node;

(c) communicating said upgrade and at least one or more remaining tokens from said first node to at least one other node of said plurality of nodes than said first node;

(d) communicating said upgrade from said at least one other node to at least one selected remaining node of said plurality of nodes not having received said upgrade; and (e) repeating step (d) until said upgrade is communicated to said plurality of nodes or until a number of nodes in the ad-hoc network corresponding to the number of tokens transferred from the master node have received the upgrade.

12. The method for delivering an upgrade to a plurality of nodes operating in an ad-hoc network as recited in claim 11 wherein one node of said plurality of nodes is a leader node; said leader node accounting for an extant said plurality of nodes populating said network and accounting for an upgrade-level of each respective node of said extant plurality of nodes populating said network; said leader node notifying other nodes of said plurality of nodes than said leader node of availability of said upgrade.

13. A method for delivering an upgrade to a plurality of nodes operating in an ad-hoc network as recited in claim 11 wherein a plurality of said first nodes in said ad-hoc network can receive the upgrade element and one or more tokens at the same time.

* * * * *